(12) United States Patent
Komiak et al.

(10) Patent No.: US 7,106,245 B2
(45) Date of Patent: Sep. 12, 2006

(54) DIGITAL RF TAG

(75) Inventors: James J. Komiak, Merrimack, NH (US); Danny A. Barnum, Merrimack, NH (US); David E. Maron, Merrimack, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 190 days.

(21) Appl. No.: 10/501,652

(22) PCT Filed: Jan. 22, 2003

(86) PCT No.: PCT/US03/02003

§ 371 (c)(1),
(2), (4) Date: Jul. 15, 2004

(87) PCT Pub. No.: WO03/063368

PCT Pub. Date: Jul. 31, 2003

(65) Prior Publication Data

US 2005/0206551 A1    Sep. 22, 2005

Related U.S. Application Data

(60) Provisional application No. 60/350,575, filed on Jan. 22, 2002.

(51) Int. Cl.
*G01S 13/79* (2006.01)
(52) U.S. Cl. ............... 342/42; 342/44; 342/45; 342/51
(58) Field of Classification Search ............. 342/42–51
See application file for complete search history.

(56) References Cited

U.S. PATENT DOCUMENTS 3,713,148 A * 1/1973 Cardullo et al. ............. 342/42
4,724,427 A * 2/1988 Carroll ..................... 340/572.1
5,416,486 A * 5/1995 Koert et al. .................. 342/42
5,450,086 A * 9/1995 Kaiser ........................ 342/42
5,469,170 A * 11/1995 Mariani ...................... 342/51

(Continued)

FOREIGN PATENT DOCUMENTS

WO    WO 3063368 A2 *  7/2003

OTHER PUBLICATIONS

"A digital signal processing algorithm for detecting interrupted continuous wave undersea tracking signals", Kennedy, S.P. et al, Electronic Engineering in Oceanography. 'Technology Transfer from Research to Industry'., 7th Int'l Conf. on Jun. 23-25, 1997, pp. 193-197.*

(Continued)

*Primary Examiner*—John B. Sotomayor
(74) *Attorney, Agent, or Firm*—Robert K. Tendler; Daniel J. Long (57) ABSTRACT

An RF tag is provided to communicate with an interrogating source in which the tag has programmability and flexibility to uplink data to multiple platforms. As such the RF tag functions as a miniature programmable transceiver capable of communicating with a plurality of different platforms each having different waveform characteristics. With well-controlled spectral characteristics due to stored waveforms and the use of specialized direct digital up and down conversion techniques, data rates up to 256 kbps are achievable. The tag is thus capable of converting microwave signals directly to digital inputs, and the transmitter generates microwave signals directly from digital outputs. Flexible digital processing also allows a throughput of 900 BOPS when using field programmable gate arrays.

18 Claims, 6 Drawing Sheets

U.S. PATENT DOCUMENTS

| | | | |
|---|---|---|---|
| 5,793,324 A * | 8/1998 | Aslanidis et al. | 342/51 |
| 6,538,563 B1 * | 3/2003 | Heng | 340/10.2 |
| 7,046,957 B1 | 5/2006 | Farr et al. | 455/11.1 |
| 7,057,520 B1 | 6/2006 | Bartz et al. | 340/825.49 |
| 2004/0036626 A1 * | 2/2004 | Chan et al. | 340/870.17 |
| 2004/0113790 A1 * | 6/2004 | Hamel et al. | 340/572.1 |
| 2004/0178944 A1 * | 9/2004 | Richardson et al. | 342/43 |
| 2005/0206551 A1 * | 9/2005 | Komiak et al. | 342/42 |

OTHER PUBLICATIONS

"Data cache energy minimizations through programmable tag size matching to the applications", Petrov, P.; Orailoglu, A. System Synthesis, 2001. Proceedings. The 14th International Symposium on 2001 pp. 113-117.

"Design and Development of a Miniaturized Embedded UHF RFID Tag for Automotive Tire Applications", Basat, S.; et al. Antenna Technology Small Antennas and Novel Metamaterials, IEEE International Workshop on Mar. 6-8, 2006 pp. 160-163.

"Radio signals for SAW ID tags and sensors in strong electromagnetic interference", Pohl, A.; Seifert, F.; Reindl, L.; Scholl, G.; Ostertag, T.; Pietsch, W. Ultrasonics Symposium, 1994. Proceedings. IEEE vol. 1, Nov. 1-4, 1994 pp. 195-198.

* cited by examiner

DIGITAL RF TAG

RELATED APPLICATIONS

This Application claims rights under 35 USC § 119(e) from U.S. Application Ser. No. 60/350,575 filed Jan. 22, 2002, the contents of which are incorporated herein by reference.

FIELD OF INVENTION

The present invention relates to transceivers and more particularly to radio frequency (RF) tags.

BACKGROUND OF THE INVENTION

An RF tag is a miniature transceiver capable of communicating with a remote platform such as an aircraft or a satellite. Existing RF tags are fairly large, power-hungry, and are usually capable of operating with only a single overflying platform. What is therefore needed is a small, rugged device, capable of battery-powered operation for long periods of time, and with programmability to allow operation with many different platforms for which it is to communicate. Also needed is an RF tag for covert use so that troops wearing the RF tag can operate undetected. For commercial use, there is a requirement for vehicle, package and personnel tracking; as well as a need for a convenient light weight search and rescue device which can be worn.

SUMMARY OF THE INVENTION

The subject digital RF tag is a general purpose, programmable transceiver which operates by receiving a radar waveform, modulating it, and them transmitting back to the radar source in such a way that the signal is hidden in the radar ground clutter. This requires special modulation characteristics and attention to spurious emissions. As a feature of the subject invention, the tag is programmable which means that it can communicate with a variety of radio frequency (RF) waveforms emitted from a source of interrogating energy.

As will be seen, the subject digital RF tag may be interrogated by any kind of RF waveform based either on radar or a communications system. A key advantage is that the tag allows the waveform characteristics to be stored digitally within the tag, thus enabling the tag to communicate with an interrogating platform by modulating returned signals so that they have the same characteristics as the transmitted waveforms. Although this tag may be used in one preferred embodiment for radar waveforms, those skilled in the art, however, will appreciate that its extension to other RF waveforms, e.g., communications, is within the scope of the subject invention.

There are several techniques used by the digital RF tag which assist in the operation of the tag. First is the use of digital up/down conversion. In one embodiment, on receive, an X-Band signal is directly downconverted to digital by sampling in a fast track-and-hold device, the output of which is then converted from analog-to-digital form. The technique is described for other applications in U.S. patent application Ser. No. 10/323,060 filed Dec. 18, 2002, assigned to the assignee hereof and incorporated herein by reference.

On transmit, the digital signal is directly upconverted to the X-B and using a digital-to-analog converter, followed by gating short pulses from a return-to-zero device that tracks the waveform from the digital-to-analog converter for short periods of time and returns-to-zero its output for times in between the short pulses. This yields a pulse amplitude modulated waveform with harmonics in the X-Band. The pulse amplitude modulated waveform is filtered at the transmitter with a band pass filter to filter out all but the X-Band components. Such a return-to-zero device is described in U.S. patent application Ser. No. 10/113,279 filed Apr. 1, 2002 assigned to the assignee hereof and incorporated herein by reference.

The direct digital up/downconversion not only eliminates the use of local oscillators which makes a tag detectable thus destroying its covert operation, it also provides for efficient multiband operation. This is because the subject approach is based on sampled waveform harmonics and, therefore does not require local oscillators to support each band of interest.

Secondly, the digital RF tag establishes communications link modulation by fast-time convolution. Existing communications systems modulate the phase, frequency, and/or amplitude of a carrier in order to encode information. The digital RF tag can perform this type of modulation but can also perform a new type of modulation called fast-time convolution. In this method, the information is encoded onto the taps of a programmable convolver. A received radar waveform is then passed through this convolver and the resulting signal is transmitted. This approach provides a means of modulating many bits of data onto a single radar pulse while not distorting the radar spectrum, thus achieving a high data rate.

The above digital processing includes as a feature the matching of the convolver tap spacing to the radar waveform bandwidth. The traditional approach is to use a convolver with a variable number of time delays between taps. The approach used in the subject tag utilizes a fixed length convolver preceded by a programmable decimator. The result of processing decimated data through the fixed length convolver is equivalent to varying the time delays between the taps, thus to eliminate the problem of providing a bulky expensive variable length convolver. This means that a small fixed length convolver can handle many different interrogating waveforms and need not be specially adapted for each incoming waveform.

As to programmability, most of the operational features are programmable including communication protocols, authentication and interrogation procedures, transmit power, message encoding algorithm, modulation characteristics, frequency, and bandwidth. Moreover, at the level of sub-modules within the tag, one can use a meander line loaded antenna (MLA) at X-Band. This antenna type is described in U.S. Pat. No. 6,765,57 assigned to the assignee hereof and incorporated herein by reference, and has previously been used at lower frequencies.

Moreover, the technique described in U.S. Pat. No. 4,734,751 may be used to achieve variable transmit gain and power. The RF transmit circuitry uses segmented dual gates for digitally controlled variable gain and variable power with very high efficiency. While use of this technique for radars has been described, the use of this approach in a communications application is new and is useful in lowering the returned signal to just that necessary for receipt by an over flying aircraft or satellite. This minimizes detectability of the tag in covert operations.

As to applications for the subject digital RF tag, the tag supports automated tracking. The tag has the potential to be used for automated tracking of cargo, vehicles, or other objects. In this mode, a satellite system interrogates tags located on objects to be tracked, accepts the tag replies and updates a database of current locations. Authorized users then interrogate this database via internet access. Tracking possible if a suitable airborne or space-based radar is employed as the cooperating platform. Also subcarriers from commercial radio stations can be used for interrogating the tags.

The tag may also be used as a RF front end for universal routers. In this embodiment, a truly universal router handles links with fiber, copper, and RF links. In one embodiment, for the RF links, a universal router includes several tag modules which serve as broadband, programmable transceivers. This allows the router to be tailored to a particular need by software rather than by developing new hardware modules.

Finally, the subject tag can be used as a Search-and-Rescue Transponder. The tag in this application is placed in lifejackets, life rafts, aircraft seat cushions, etc. The transponder is activated by contact with water and then detected by search and rescue aircraft and ships with X-Band radars to deliver much more information than is available from standard Search & Rescue Transponders (SARTs) which is generally limited to a series of dots on the radar screen going to the transponder. No other information such as GPS position, identity of the individual or the individual's particular problem or need is transmitted by these SARTs.

In summary, an RF tag is provided to communicate with an interrogating source in which the tag has programmability and flexibility to uplink data to multiple platforms. As such the RF tag functions as a miniature programmable transceiver capable of communicating with a plurality of different platforms each having different waveform characteristics. With well-controlled spectral characteristics due to stored waveforms and the use of specialized direct digital up and down conversion techniques, data rates up to 256 kbps are achievable. The tag is thus capable of converting microwave signals directly to digital inputs, and the transmitter generates microwave signals directly from digital outputs. Flexible digital processing also allows a throughput of 900 BOPS when using field programmable gate arrays.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
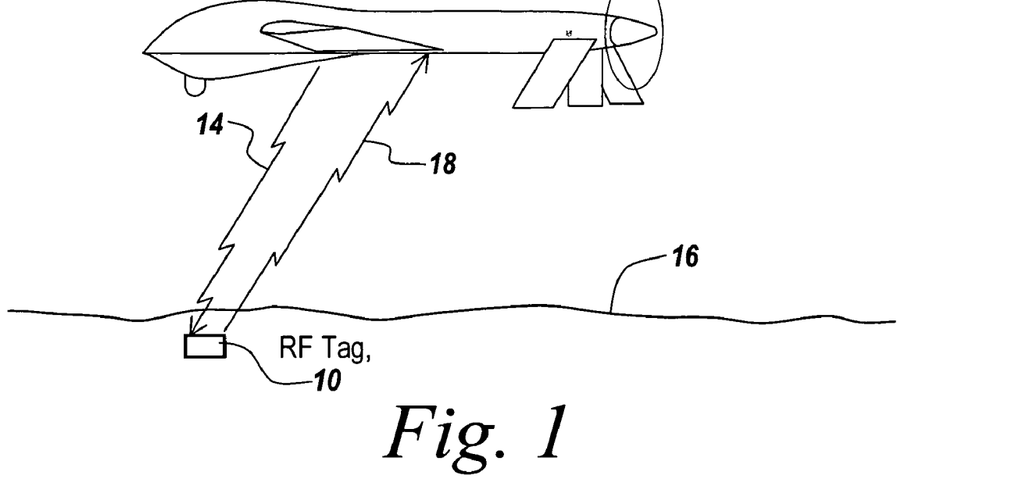
FIG. 1 is a diagrammatic representation of the utilization of the subject RF tag interrogated by and communicating with an overflying aircraft.

Referring now to FIG. 1, in one embodiment an RF tag 10 located on a piece of equipment or stand-alone is utilized to communicate with an overlying aircraft 12, the radar of which emits pulses 14 to scan terrain 16 for the purpose of interrogating any tags which may be illuminated by the radar pulses. Alternatively terrestrial-based transmitters can be used to interrogate the subject tag.

When the radar pulses impinge on tag 10, a return signal 18 is embedded within the returned pulse and is transmitted back to aircraft 12, with the demodulation of the signal providing information that has been supplied to the tag either by manual entry, reprogramming or, for instance, through the connection of a GPS receiver to the tag. What this provides is a relatively low powered device which can be interrogated by an over flying aircraft or in fact a satellite as well as an unmanned air vehicle so that, for instance, troops can be located, packages can be tracked, and information on the ground can be communicated back to the radar interrogation source. This information is communicated through the use of an ultra small RF tag which is small enough to be embedded in clothing or unobtrusively placed on equipment.

Key to the ability to provide a covert device in an extremely small power stingy package, in the subject invention, the RF tag utilizes a digital up/down direct conversion technique, and a novel communications link modulation scheme involving fast time convolution, with the unit itself being programmable for communication protocols, authentication and integration procedures, as well as transmit power, message encoding, algorithms, modulation characteristics, frequency and bandwidth.

Key to the efficient use of the RF tag is the use of a digital signal processing, DSP, convolver which operates on the analog-to-digital sampled interrogating pulse which it multiplies with the output from a control processor storing the information to be transmitted back. In one embodiment, the subject tag provides a covert low observable signal embedded in the radar waveform bandwidth.

In a preferred embodiment, the modulation involves generating a pseudo noise code.

Figure 2:
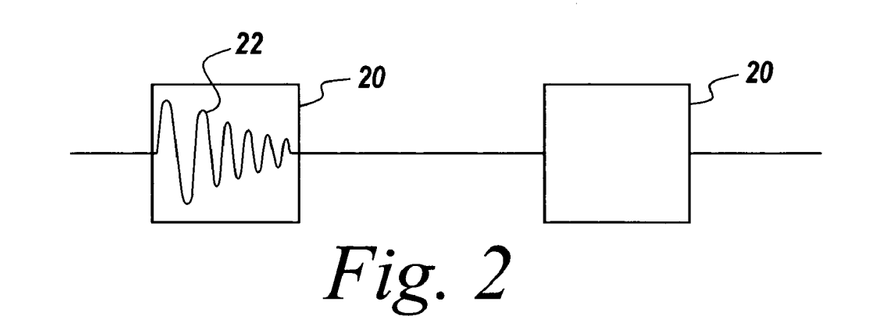
FIG. 2 is a diagrammatic representation of the chirped pulse produced by the radar of the aircraft of FIG. 1.
Figure 3:
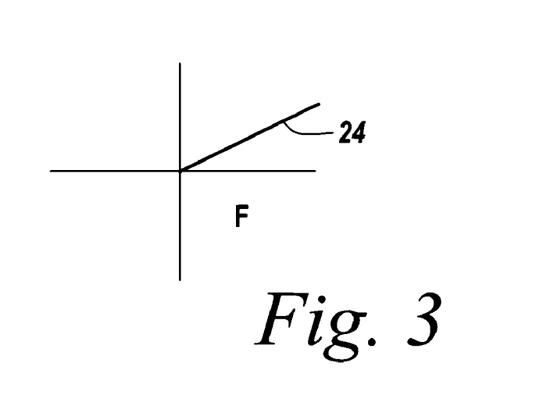
FIG. 3 is a frequency versus amplitude graph showing the linear sweep for the frequency of the chirped signal of FIG. 2.

Referring to FIG. 2, it will be appreciated that what is transmitted from the over flying aircraft is a series of radar pulses 20 which in one embodiment include a chirped waveform 22 which is frequency chirped as illustrated in FIG. 3 by waveform 24, in the illustrated embodiment going from a lower frequency to a higher frequency in a linear fashion. Chirped signals are in general used for better resolution and increased range as well as immunity to interference and noise.

Figure 4:
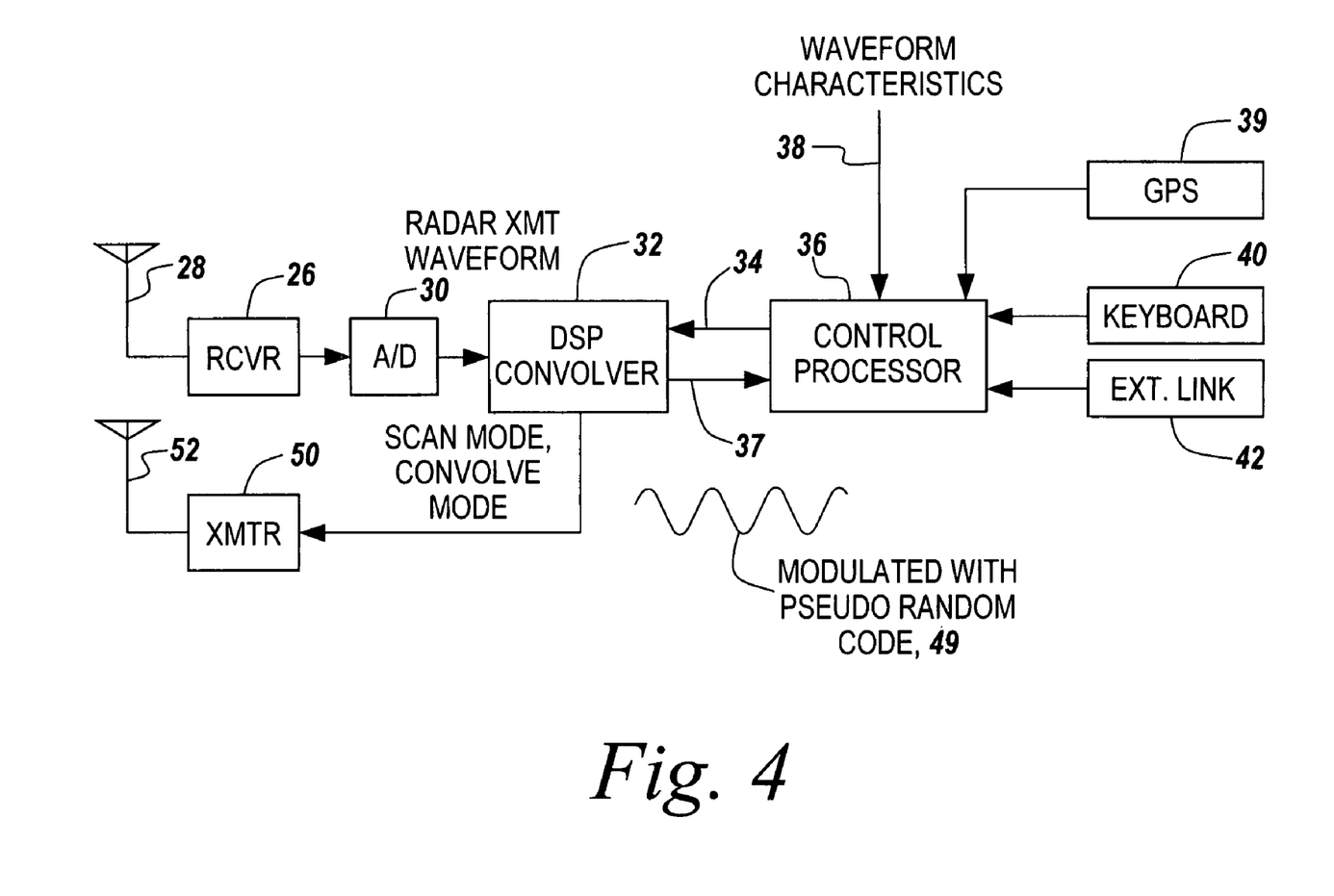
FIG. 4 is a block diagram of the subject RF tag showing the utilization of a DSP convolver and control processor having as one of its inputs a set of waveform characteristics.

Referring now to FIG. 4, in one embodiment the subject tag includes an RF receiver 26 coupled to an antenna 28. The output of the RF receiver is converted by an analog-to-digital converter 30 into a digital representation of the transmitted radar waveform. This is applied to a digital processor functioning as a convolver 32 which convolves the radar transmit waveform with the desired data message 34 available as an output from a control processor 36. In one embodiment, processor 36 is preloaded with waveform characteristics as illustrated at 38. The waveform characteristics are the center frequency, chirp range, pulse width, and pulse repetition intervals or PRI of the expected incoming radar pulse. Note that the DSP convolver operates in several modes. The first mode of operation is a scan mode in which the convolver scans the incoming signal as to its waveform characteristics. When these waveform characteristics are transmitted to control processor 36 on line 37 match preloaded waveform characteristics 38 then communication is initiated.

The modulation to be embedded into the returned signal can either be from a GPS receiver 39, keyboard entered at 40 or from an external link 42, all coupled to the control processor.

The output of the DSP convolver is a modulated waveform 49 involving a pseudo noise code which is applied to transmitter 50 and is radiated out through an antenna 52 so that the RF tag acts a transponder which transmits back to the over flying communications entity the specific encoded information required.

Note, as mentioned above, that while the subject invention will be described in connection with overflying vehicles, the subject RF tag can also be interrogated by terrestrial sources such as radio station subcarriers and the like.

As will be appreciated, it is very important not to interfere with the radar's normal functions. In so doing it is important to understand, at least initially, how the radar functions with chirped waveform signals.

Note also that in terms of programmability, the waveform characteristics can be either directly preinstalled in processor 36 or can be varied via operator input by keyboard 40.

Figure 5:
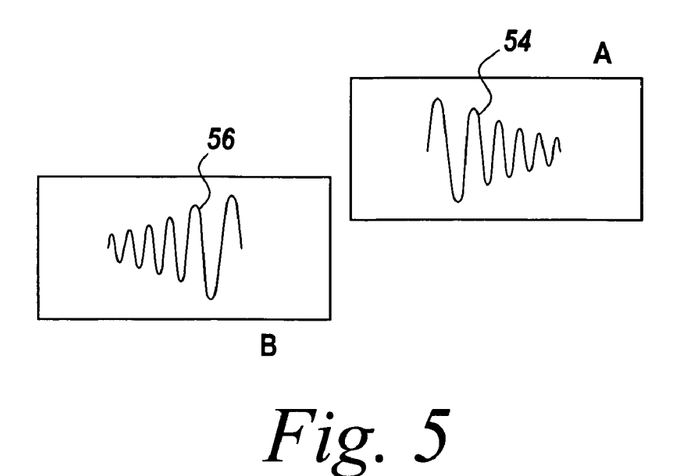
FIG. 5 is a diagrammatic representation of the processing for the radar receiver for the aircraft of FIG. 1, indicating the utilization of a chirped waveform and the inverse thereof, with the multiplication of these two waveforms and integration over a given offset providing a sharp spike indicating the range of the radar target to the radar.
Figure 6:
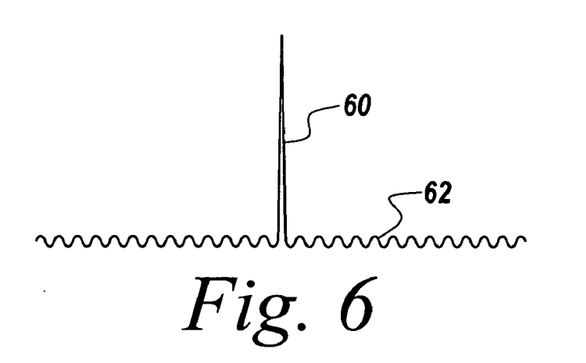
FIG. 6 is a waveform illustrating the production of a sharp spike which is the result of the multiplication of the two waveforms of FIG. 5, and integration over an offset.

Referring now to FIG. 5, it will be appreciated that the radar itself transmits a up-chirped waveform 54 which goes from a low frequency to high frequency. The radar is also provided with a down-chirped replica 56 of the waveform. When the two are multiplied together and averaged, the time convolution, as illustrated in FIG. 6, results in a spike 60 which is used in the production of the radar image as the time of the spike determines the range of the reflecting radar target. The remainder of the signal which is received at the over flying radar is illustrated at 62 which includes noise and clutter. Because of the multiplying of the inverted and original chirped waveforms over a given offset, interfering signals such as jamming signals are reduced to a very low level as illustrated by waveform 62.

Figure 7:
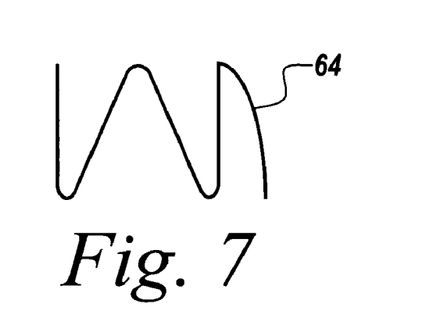
FIG. 7 is a waveform illustrating the recovering of a biphase-modulated signal.

Referring to FIG. 7, in one embodiment, if a bi-phase modulated pseudo noise coded signal is utilized, the result of the time convolution of waveform 64 with waveform 56 becomes the waveform illustrated at 62. What this means is that under normal circumstances the modulation itself is contained within the clutter or the noise associated with the environment.

The desired data is extracted by the time convolution of the pseudo noise encoded preamble for the data message with waveform 54, with the preamble preceding the data stream. This known preamble is resident in the radar's signal processor and is designed to extract the message from the tag on the up link. This preamble is also resident in the tag. Time convolution of the two waveforms the results in the extraction of the data.

Figure 8:
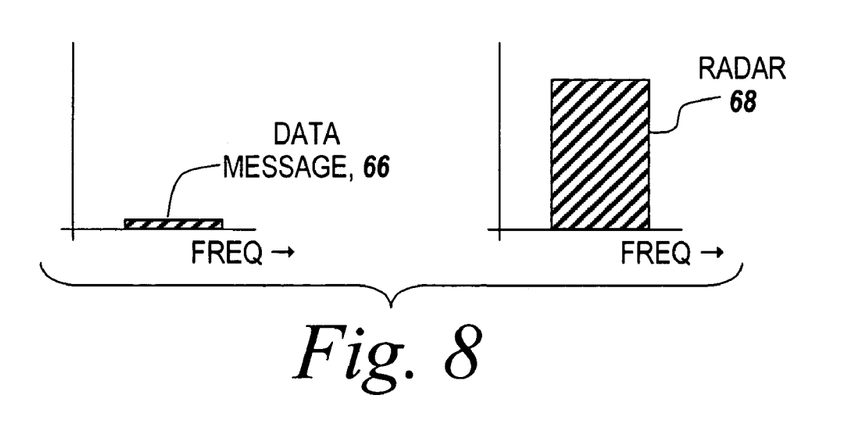
FIG. 8 is a diagrammatic illustration of the relative amplitude of the data message as opposed to the returned radar signal, illustrating that the data message is well submerged within the clutter and noise of the signal returned to the interrogating radar.

Referring to FIG. 8, what will be seen is that to the external world the data message, here illustrated at 66, has an amplitude which is much less than the amplitude of the radar spectrum, with the graphs of FIG. 8 being in the frequency domain. Thus, the relative amplitude of the radar frequency spectrum 68 is orders of magnitude higher than that of the data message.

Figure 9:
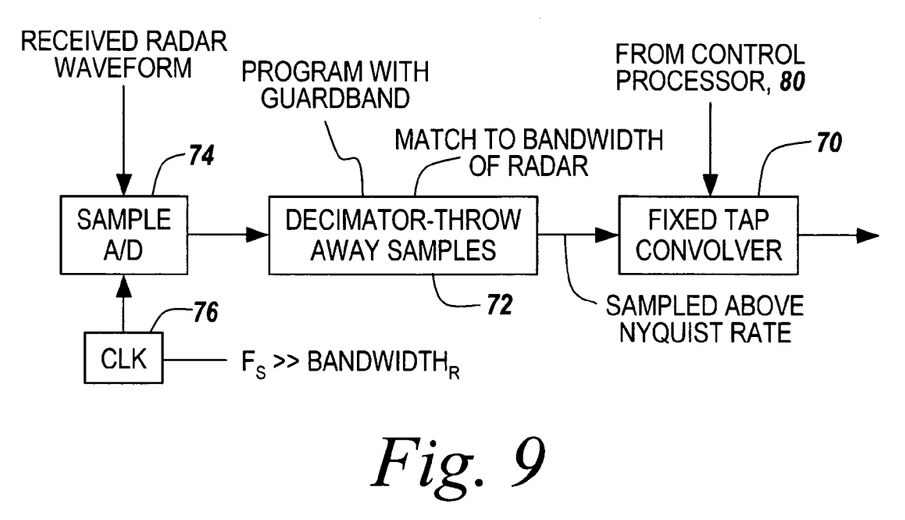
FIG. 9 is a block diagram of the utilization of a decimator ahead of a fixed tap convolver to permit the utilization of the fixed tap convolver to convolve a message signal with a received radar waveform from a variety of different sources.

Referring to FIG. 9, in the past there has been a need to provide a variable tap convolver to match the bandwidth of the various interrogating radars or other interrogating signals. Thus, for instance, assuming an X-band interrogating radar signal were to be utilized with a particular chirp rate and a particular pulse repetition interval, then the variable tap convolver needed to be set for this particular interrogating waveform. Since there is a possibility of numerous different types of interrogating waveforms, the variable tap convolver needed to be quite large and was both expensive and consumed large amounts of power. Moreover, the convolving capability with a variable tab convolver was limited to that which was initially designed into the convolver itself.

In an effort to provide a universal convolver which can operate regardless of the characteristics of the incoming waveform, a fixed tap convolver 70 is used which is preceded by a decimater 72, the purpose of which is to throw away samples which are generated by a sampling device such as a sampling analog-to-digital converter 74. This sampling A/D converter is driven by a clock 76 at a frequency $F_s$ which is much greater than the bandwidth of the incoming signals.

For instance, the frequency of the clock might be in the 800 MHz range, whereas the Nyquist frequency of the interrogating signal would be in the 20 to 50 MHz range.

It is the purpose of the decimater to throw away unused samples such that the sampling rate from the output of the decimater matches the rate associated with the taps on the fixed tap convolver. Thus, the decimater matches the bandwidth of the incoming radar signals to the fixed tap convolver data rate. Note that the fixed tap convolver has as its other input, input 80 which is from the control processor so that the convolver can convolve the data to be transmitted with the output of the decimater.

Figure 10:
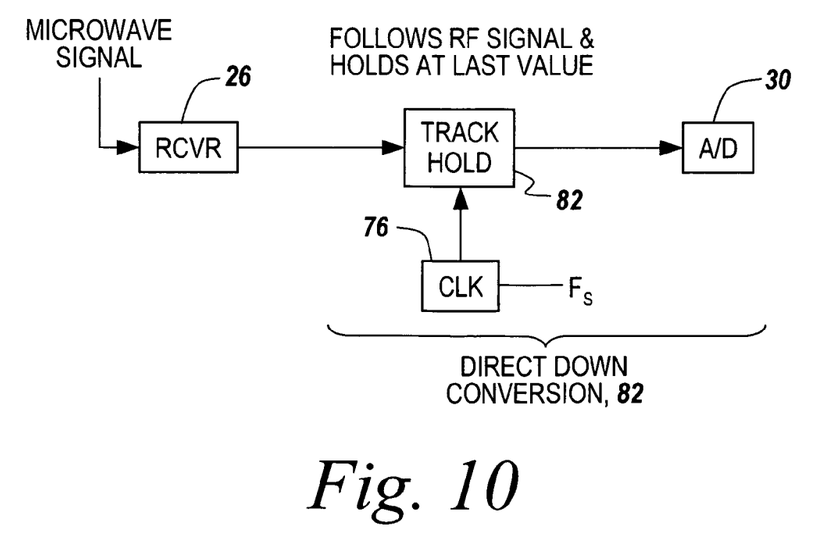
FIG. 10 is a block diagram of the utilization of a track and hold circuit for direct downconversion of the microwave signal without the utilization of local oscillators.

Referring now to FIG. 10, this figure illustrates a system for direct down conversion as illustrated at 82 which takes the output from receiver 26 and couples it to a track and hold amplifier 82, which is coupled to clock 76 so that the track and hold amplifier follows the RF signal and holds its last value upon the occurrence of a so-called last clock pulse. The purpose of this process is to provide a steady signal to analog-to-digital converter 30. The track and hold amplifier permits the use of a relatively slow analog-to-digital converter which ordinarily cannot directly sample a microwave signal. In this case, the track and hold amplifier performs a band pass sampling function, meaning that it utilizes under sampling but preserves the modulation while at the same time aliasing the carrier.

Figure 11:
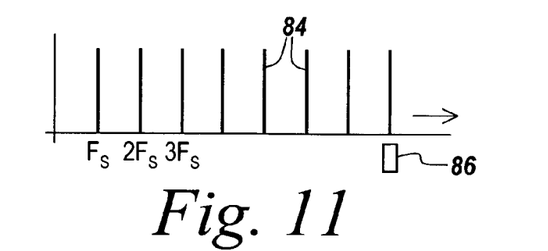
FIG. 11 is a waveform diagram illustrating the clock pulses coupled to the track and hold circuit of FIG. 10, also illustrating the existence of the radar pulse at the clock frequency corresponding to the microwave region of the electromagnetic spectrum.
Figure 12:
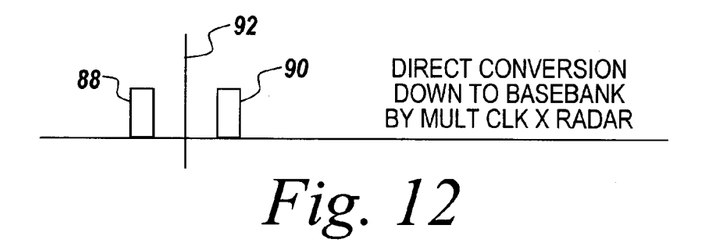
FIG. 12 is a graph showing the result of the direct conversion down to base band accomplished by multiplying the clock pulses of FIG. 11 by the radar pulse, thus to provide side bands about a DC reference.

Referring to FIG. 11, in the frequency domain the clock pulses at $F_s$, $2F_s$, $3F_s$ . . . are illustrated at 84 along with the radar signal 86 which when multiplied with the clock pulses produces the base band side bands as illustrated in FIG. 12 at 88 and 90 about the DC axis 92. What is provided is direct conversion down to the base band by multiplying the clock pulses by the radar pulse.

The use of direct down conversion results in smaller size, less power consumption, lower cost componentry and elimination of local oscillator re-radiation. From a convert operations point-of-view, this is important because should the tag utilize local oscillators, these local oscillators can be detected by sniffing apparatus which can locate the person who would otherwise seek to operate in a covert manner.

Figure 13:
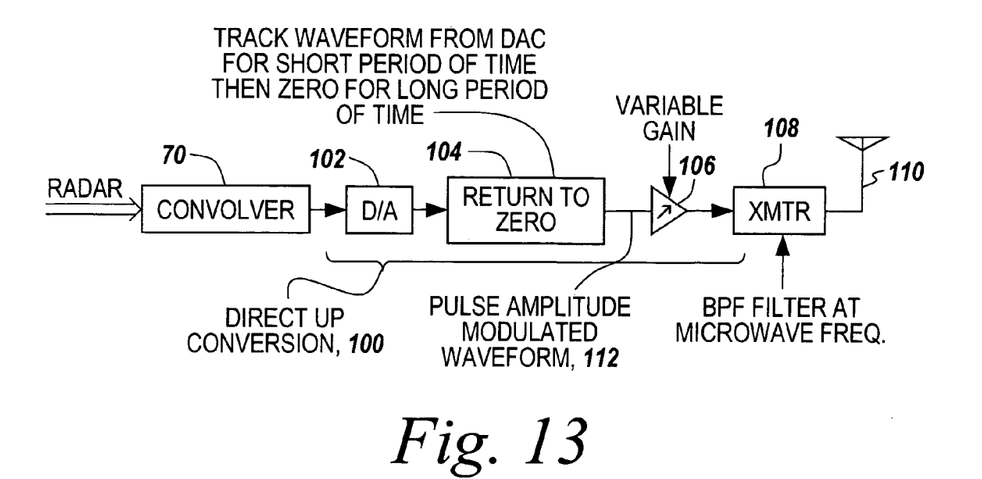
FIG. 13 is a block diagram showing direct upconversion utilizing a return-to-zero unit which tracks the waveform from a digital-to-analog converted signal for a short period of time with zeros being provided for the long period of time in between the short periods.

Referring now to FIG. 13, the direct up conversion technique is illustrated at 100 which takes the output of convolver 70 and converts it to an analog signal through the utilization of a conventional digital-to-analog converter 102. The output of digital-to-analog convert 102 is applied to a return-to-zero resampler 104. The purpose of this return-to-zero resampler is to track the waveform from the digital-to-analog converter for a short period of time and then provide a zero output for the longer periods of time in between. The operation of this device is described in the aforementioned patent application.

The output of resampler is optionally provided to a variable gain amplifier 106 described in U.S. Pat. No. 4,734,751 issued Mar. 29, 1988 and assigned to the assignee hereof, the output of which is then coupled to a transmitter 108 in turn coupled to an antenna at 110, with transmitter 108 providing a band pass filter function at microwave frequencies.

Figure 14:
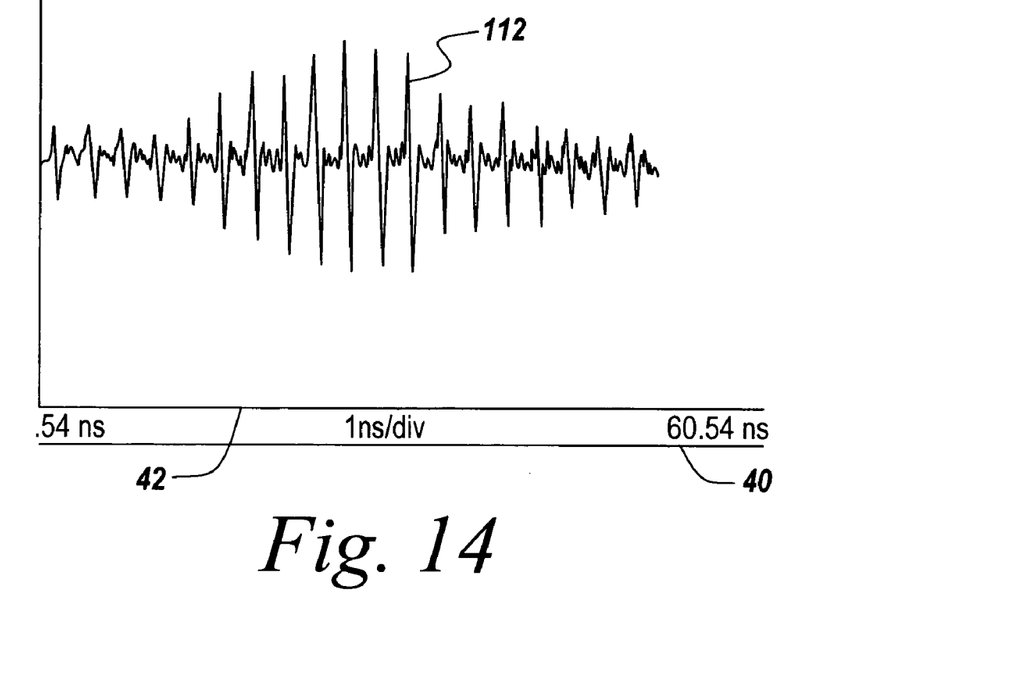
FIG. 14 is a waveform diagram illustrating the result of the utilization of the return-to-zero unit of FIG. 13, showing the generation of a waveform envelope which is to be transmitted; and, FIG. 15 is a waveform diagram illustrating the filtering out of frequencies below the microwave frequency clock pulse associated with the clock of FIG. 10.

As illustrated in FIG. 14, it will be appreciated that the return-to-zero resampler creates a pulse amplitude modulated waveform 112 which is depicted to have tracked the output of the digital-to-analog converter to a very good approximation. As can be seen, the waveform has an envelope corresponding to the applied CW sine wave from the digital-to-analog converter.

Figure 15:
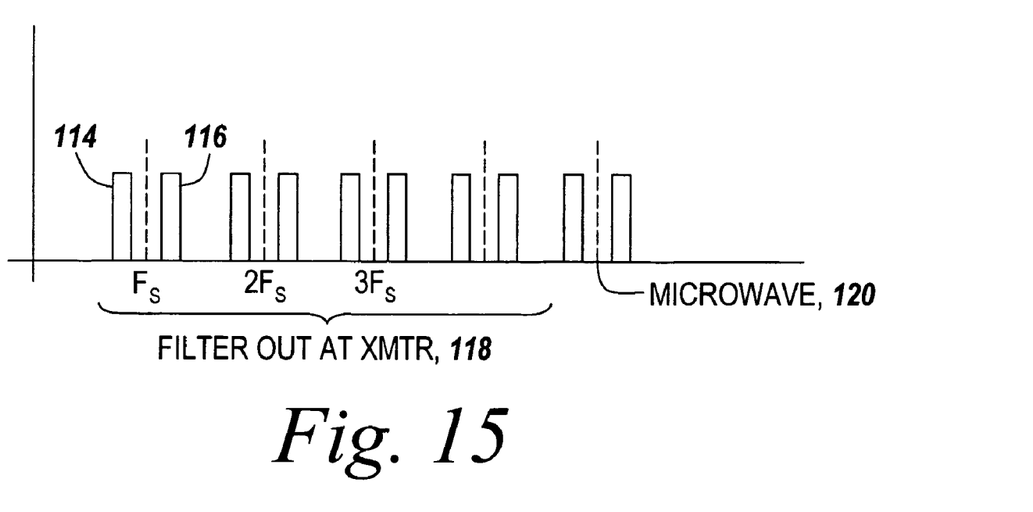

Referring to FIG. 15, the output of the return-to-zero resampler in the frequency domain is illustrated.

Here, to either side of the sampling frequencies $F_s$, $2F_s$, $3F_s$ . . . are the spectrums 114 and 116 corresponding to the output of convolver 70 of FIG. 13. Since the clock theoretically provides frequencies all the way out to infinity, a band pass filter in the transmitter is used to filter out all those clock frequencies which do not correspond to the microwave frequency of interests illustrated at 118. This is done by a conventional band pass filter in the transmitter and leaves only the microwave clock frequency 120.

What will be appreciated is that the sampling frequency $F_s$ used on direct down conversion is the self-same sampling frequency which is used on direct up conversion. The result is preservation of the spectrum of the returned signal.

In summary, the tag is capable of transmission upon receipt of an interrogating waveform. For radars, this received waveform is modulated and is transmitted in such a way that the signal is hidden in the radar ground clutter. This requires the aforementioned special modulation characteristics and attention to spurious emission.

The tag is programmable which means it can communicate with a wide variety of radio frequency waveforms emitted from an interrogating platform.

Moreover, the basic technology applies to any kind of RF waveform based on either radar or communications. The tag innovatively allows the waveform to be stored digitally within the tag, thus enabling the tag to generate a return that communicates with any interrogating platform.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. An RF tag comprising a programmable miniature transceiver, said transceiver including a digital signal processing convolver for convolving a digital representation of the waveform transmitted to said tag with information to be embedded in the signal returned by said transceiver to the platform with which said transceiver is communicating, said transceiver capable of communicating with a plurality of different platforms which operates by interrogating said tag with a predetermined waveform and receiving a waveform transmitted by said tag to said platform with tag generated information embedded therein.

2. The RF tag of claim 1, wherein said transceiver includes a control processor having as an input thereto said information for encoding said information in a bi-phase pseudo random code modulation format.

3. The RF tag of claim 1, wherein said convolver includes a unit for direct up/down digital conversion of the waveforms transmitted and received respectively by said tag.

4. The RF tag of claim 1, wherein the information to be embedded in the signal returned by said transceiver includes a fast-time convolution modulator.

5. The RF tag of claim 1, and further including a waveform characteristics detector coupled to the digital representation of the waveform transmitted to said tag and a processor preloaded with waveform characteristics coupled to said convolver such that said information to be embedded is embedded into a waveform having characteristics matching those detected by said waveform characteristics detector.

6. The RF tag of claim 2, wherein said unit for direct up/down digital conversion includes an analog-to-digital converter for sampling the waveform transmitted to said tag and further including a clock coupled to said analog-to-digital converter, said clock having a predetermined frequency much greater than the bandwidth of the waveform transmitted to said tag.

7. The RF tag of claim 6, and further including a decimator coupled to said analog-to-digital converter for throwing away a predetermined number of samples therefrom.

8. The RF tag of claim 7, wherein said convolver includes a fixed tap convolver, said decimator matching the output thereof to the taps on said fixed tap convolver, whereby a fixed tap convolver can be used regardless of the bandwidth of the waveform transmitted to said tag, thus to adapt said tag to a wide variety of platforms which generate interrogating waveforms.

9. The RF tag of claim 8, wherein said decimator throws away samples such that the sampling rate of the remaining signal is above the Nyquist rate for the waveform transmitted to said tag.

10. The RF tag of claim 3, wherein said direct digital down conversion unit includes a track and hold unit and a clock coupled thereto, said track and hold unit having an input coupled to the waveform transmitted to said tag, said track and hold unit following said last-mentioned waveform and holding the last value thereof at the end of a predetermined interval established by said clock, thus to directly down convert the frequency of the waveform transmitted to said tag.

11. The RF tag of claim 10, wherein the clock frequency of said, clock is much greater than the bandwidth of the waveform transmitted to said tag.

12. The RE tag of claim 10, wherein said direct up conversion unit includes a return-to-zero unit to track the waveform from said convolver for a short period of time and then to output zero for time in between.

13. The RF tag of claim 12, wherein said return-to-zero unit includes a clock clocked at the same frequency as said track and hold unit, thus not to preserve the characteristics of the waveform from said platform.

14. The RF tag of claim 12, wherein the waveform transmitted to said tag is in the microwave region of the electromagnetic spectrum, and further including a band pass filter for passing only microwave signals, thus to effectuate direct up conversion of the signal from said convolver.

15. The RF tag of claim 1, wherein said tag is placed on an individual said tag including a geopositioning receiver for indicating the position of said individual, said position being embedded into the waveform transmitted back to said platform.

16. The RF tag of claim 15, wherein said transceiver includes a limiter to limit the amplitude of the waveform transmitted back to said platform to just that above which said platform can receive, whereby, overt operation is established.

17. The RF tag of claim 1, wherein said tag includes a receiver for receiving a waveform from one transmitter and a transmitter for transmitting at least a portion of said waveform to a receiver spaced from said one transmitter, thus to perform a routing function.

18. The RF tag of claim 15, wherein said tag a search and rescue transponder, wherein said information embedded in the transmission back to said platform includes tag location.

* * * * *